Patented Mar. 7, 1933

1,900,001

UNITED STATES PATENT OFFICE

LYNNE ULICH, OF RACINE, AND ROBERT J. GOODRICH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

METHOD OF PURIFYING AN ANTHRAQUINONE BODY

No Drawing.    Application filed February 6, 1930.   Serial No. 426,435.

This invention relates to the purification of an anthraquinone compound and, more particularly, to the purification of crude beta-amino-anthraquinone.

It has been well established that the purity of starting materials for the preparation of dyestuffs is important, because in many cases the amount of impurities in the dyestuffs or end products obtained when using an impure starting material is entirely out of proportion to the amount of impurities present in the starting material. This is particularly true with respect to beta-amino-anthraquinone as pointed out in the literature.

The previous method of technically purifying beta-amino-anthraquinone has involved a recrystallization of beta-amino-anthraquinone from relatively strong sulfuric acid, whereby beta-amino-anthraquinone sulfate is precipitated and the impurities go into solution in the strong sulfuric acid mother liquor.

We have now discovered that certain objectionable impurities in crude beta-amino-anthraquinone can be selectively acted upon by mild sulfonating agents so as to be rendered water soluble, whereby upon addition of water to the sulfonation mass the impurities go into solution, while the beta-amino-anthraquinone is substantially unaffected and can be recovered in a pure form from the aqueous solution of the impurities. This process is particularly applicable to beta-amino-anthraquinone obtained by amidating "silver salt".

It is, accordingly, an object of this invention to provide a method for preparing a technically pure beta-amino-anthraquinone from crude beta-amino-anthraquinone as obtained by conventional methods.

A further object of this invention is to provide a method for preparing a technically pure beta-amino-anthraquinone from crude beta-amino-anthraquinone as obtained by amidating silver salt.

Other and further important objects of this invention will become apparent from the following description and appended claims.

Our improved process, in its broadest aspect, comprises a treatment of crude beta-amino-anthraquinone with a mild sulfonating agent to selectively transform certain impurities into water soluble products and the pouring of the reaction mass into a sufficiently large volume of water to so reduce the acid concentration of the mass that beta-amino-anthraquinone will precipitate directly in the basic state instead of in the form of a salt. The upper limit of the acid concentration following the dilution should be approximately 50%. This point of dilution can be actually determined on any sample by the color of the precipitate, since the sulfate of beta-amino-anthraquinone is gray to white whereas the base is red. However, it is preferable to reduce the final sulfuric acid concentration of the reaction mass to from about 5 to 10% strength, to thereby render the concentration of impurities in the mother liquor relatively small, thus greatly facilitating their removal from the beta-amino-anthraquinone (base).

The strength of the sulfuric acid or other sulfonating agent for the water solubilization of the impurities with minimum losses of beta-amino-anthraquinone will vary, depending upon different operating conditions, especially the temperature used for the treatment and the source of the beta-amino-anthraquinone.

The influence of the temperature on the strength of the acid employed can be clearly seen from the following. With sulfuric acid of about 80% strength and a temperature of 125° C., the losses of beta-amino-anthraquinone through sulfonation of the same are negligible. However, when using sulfuric acid of approximately 97% strength on the same beta-amino-anthraquinone at a temperature above approximately 115° C. the losses through sulfonation are material. Generally, with sulfuric acid of less than 80% strength, the upper temperature limit may be raised above 125° C. without substantial loss of beta-amino-anthraquinone through sulfonation. For the most economical working, the temperature of treatment will depend upon the specific strength of sulfuric acid employed, the higher the strength of the sulfuric acid the lower the temperature necessary for the solubilizing of the impurities. Any of the ordinary mild sulfonating agents may be used, the process even being operative with sodium bisulfite.

The following examples in which parts by weight are given serve to illustrate various methods of carrying out our invention.

*Example 1*

Ten parts of technical beta-amino-anthraquinone obtained by amidating a beta substituted anthraquinone, are added to 100 parts of sulfuric acid of approximately 80% strength and heated while agitating, to 125° C. This temperature is maintained for about 12 hours. The mass is then cooled to about 60° C. and charged into 1000 parts of cold water. The dilution mass is cooled to room temperature, filtered and the filter cake washed with cold water and dried. The beta-amino-anthraquinone obtained is in a highly purified state.

*Example 2*

The process is carried out the same as described in Example 1, except that 80 parts of approximately 85% sulfuric acid are employed and the reaction mass is maintained at about 120° C. for 20 hours.

*Example 3*

A quantity of technical beta-amino-anthraquinone in press cake form containing about 50% water and about 10 parts of beta-amino-anthraquinone is added to 100 parts of 87% sulfuric acid and treated as in Example 1. The product is obtained in a high state of purity.

*Example 4*

Ten parts of crude beta-amino-anthraquinone, obtained by amidating a beta substituted anthraquinone are added to 100 parts of 20% sodium bisulfite solution. The mixture is boiled, (reflux) for 12 hours. The mass is then poured into 1000 parts of cold water, cooled to room temperature and filtered. The filter cake is dried and ground. The resulting beta-amino-anthraquinone is substantially purer than the crude product.

The advantages gained by following the method disclosed above are a substantially complete removal of the impurities due to larger volumes of mother liquor; the elimination of a step in the usual operation; a reduction in the cost of upkeep of the apparatus due to the fact that the acid liquors handled are much less corrosive on such apparatus; and a greater yield and purer product.

It is, of course, to be understood that the time, temperature, and the amount and strength of sulfuric acid as given in the above examples can be varied and still effect a purification of the beta-amino-anthraquinone. These examples are merely given by way of illustration and accordingly, we do not intend to be limited in the patent granted except as necessitated by the prior art.

We claim as our invention:

1. The process of purifying crude beta-amino-anthraquinone which comprises treating impure beta-amino-anthraquinone with sulfuric acid of about 80 to 85% strength and at a temperature of about 125 to 120° C. and pouring the mass into water to separate the beta-amino-anthraquinone in basic form from the dissolved impurities.

2. The process of improving the quality of impure beta-amino-anthraquinone which comprises treating impure beta-amino-anthraquinone with sulfuric acid of about 85% strength and at a temperature of approximately 125° C. and diluting the sulfonation mass to reduce the sulfuric acid concentration to below approximately 50% strength to separate the beta-amino-anthraquinone in basic form from the dissolved impurities.

3. The process of improving the quality of crude beta-amino-anthraquinone which comprises treating impure beta-amino-anthrquinone with sulfuric acid of about 85% strength and at a temperature of approximately 125° C. and adding the sulfonation mass to water to reduce the sulfuric acid concentration to approximately 10% strength to separate the beta-amino-anthraquinone from the dissolved impurities.

4. The process of purifying crude beta-amino-anthraquinone, which comprises sulphonating the impurities by treating the impure beta-amino-anthraquinone with sulphonating agents under conditions milder than those leading to substantial amounts of beta-amino-anthraquinone sulfonic acid and precipitating the beta-amino-anthraquinone in the form of its free base by diluting the reaction mass with water.

5. The process of purifying crude beta-amino-anthraquinone which comprises sulphonating the impurities by treating the impure beta-amino-anthraquinone with strong sulfuric acid under conditions milder than those leading to substantial amounts of beta-amino-anthraquinone sulphonic acid and precipitating the beta-amino-anthraquinone in the form of its free base by pouring the reaction mass into water.

In testimony whereof, we have hereunto subscribed our names at Carrollville, Milwaukee County, Wisconsin.

LYNNE ULICH.
ROBERT J. GOODRICH.